United States Patent
Agrawal et al.

(10) Patent No.: US 7,096,359 B2
(45) Date of Patent: Aug. 22, 2006

(54) AUTHENTICATION SCHEME FOR AD HOC AND SENSOR WIRELESS NETWORKS

(75) Inventors: Dharma P. Agrawal, Cincinnati, OH (US); Lakshmi Venkataraman, San Jose, CA (US)

(73) Assignee: University of Cincinnati, Cincinnati, OH (US)

( * ) Notice: Subject to any disclaimer, the term of this patent is extended or adjusted under 35 U.S.C. 154(b) by 979 days.

(21) Appl. No.: 09/797,263

(22) Filed: Mar. 1, 2001

(65) Prior Publication Data

US 2002/0124169 A1 Sep. 5, 2002

(51) Int. Cl.
*H04L 9/00* (2006.01)

(52) U.S. Cl. ...................... 713/168; 713/153; 713/155; 713/161; 705/67

(58) Field of Classification Search ................ 713/153, 713/155, 160, 161, 168, 169, 170, 173, 178, 713/179, 180; 380/278, 270, 247
See application file for complete search history.

(56) References Cited

U.S. PATENT DOCUMENTS

| | | | | |
|---|---|---|---|---|
| 5,757,913 A | * | 5/1998 | Bellare et al. | 713/168 |
| 5,987,136 A | * | 11/1999 | Schipper et al. | 713/176 |
| 6,915,426 B1 | * | 7/2005 | Carman et al. | 713/168 |
| 6,976,168 B1 | * | 12/2005 | Branstad et al. | 713/175 |

FOREIGN PATENT DOCUMENTS

EP 1033657 A2 * 9/2000

OTHER PUBLICATIONS

Menezes et al., Handbook of Applied Cryptography, 1997, CRC Press, p. 361.*

Microsoft Computer Dictionary, 4th ed., 1999, Microsoft Press, definition of "packet header".*

Mario Gerla and Jack Tsu-Chieh Tsai, "Multicluster, mobile, multimedia radio network", 1995, Kluwer Academic Publishers, Wirel. Netw. 3, vol. 1, pp. 255-265.*

Alfred J. Menezes, Paul C. van Oorschot, Scott A. Vanstone, Handbook of Applied Cryptography., 1997, CRC Press, pp. 362,363, 399-401, 570, 571.*

Abdul-Rahman et al, *Security Issues in Mobile Systems*, University College London, Nov., 1995.

Zhou, Haas, *Securing Ad Hoc Networks*, Cornell University, Ithaca, NY 1999.

(Continued)

*Primary Examiner*—Emmanuel L. Moise
*Assistant Examiner*—Jeffery Williams, Jr.
(74) *Attorney, Agent, or Firm*—Wood, Herron & Evans, L.L.P.

(57) ABSTRACT

Strong authentication of packets sent between nodes of different clusters in a two-tier ad hoc network is provided by the cluster heads. Each cluster head authenticates nodes that enter the cluster. Thereafter, when a sending node requests a session from its cluster head with a receiving node in another cluster, the cluster head negotiates a session secret key (SSK) with the corresponding cluster head of the receiving node. Further, the cluster head provides authentication tags for the sending node to use with each packet. Each authentication tag is time-stamped, digitally signed by the cluster head, encrypted with the SSK, and includes indicators of message integrity, including a sequence number and TCP header field of checksum. The sending node further calculates a check result from a number of the authentication tags, encrypted with the SSK, so that the receiving node can authenticate the number of packets.

21 Claims, 5 Drawing Sheets

OTHER PUBLICATIONS

James Binkley, *Authenticated Ad Hoc Routing at the Link Layer for Mobile Systems*, Technical Report 96-3, Portland State University, Portland, Oregon 1996.

Corson et al, *Manet Authentication Architecture*, ietf.org, Aug. 1998.

* cited by examiner

AUTHENTICATION SCHEME FOR AD HOC AND SENSOR WIRELESS NETWORKS

FIELD OF THE INVENTION

The present invention relates to methods and apparatus for providing authentication of digital communication in an ad hoc network, and in particular, for providing authentication between wireless nodes sending packet communication.

BACKGROUND OF THE INVENTION

Mobile and wireless technology is growing at a rapid rate. These advances have resulted in breakthroughs that have made feasible new applications of data communication. For example, in areas in which there is little or no communication infrastructure, or the existing infrastructure is expensive or inconvenient to use, wireless mobile users may still be able to communicate through the formation of an ad hoc network.

In an ad hoc network, each mobile node operates not only as a host but also as a router, forwarding packets for other mobile nodes in the network that may not be within direct wireless transmission range of each other. Each node participates in an ad hoc routing protocol that allows it to discover "multi-hop" paths through the network to any other node.

Since ad hoc networks lack an infrastructure, ad hoc networks allow for unrestricted mobility and new communication uses. For example, a collaborative office or training environment may be readily created with laptop computers and computer peripherals capable of wireless communication with one another. As another example, a battlefield command and control system may allow the sharing of sensor and command information between wireless nodes carried on military vehicles and by soldiers. As yet another example, emergency personnel may coordinate logistics and relief actions in an austere environment such as the site of an earthquake or other natural disaster. As yet a further example, intelligent wireless sensor networks may be mounted on mobile platforms.

Merely being able to communicate by wireless transmission is not enough for a reliable network since networks in general have a number of security requirements. Information should be transmitted and stored by the network in a confidential manner so that only authorized parties may read it. Information should be transmitted so that integrity is maintained, preventing unauthorized parties from altering the information (e.g., writing, deleting, changing status, creating, or replaying). Information should be subject to access control by or for the target (receiving) node. In addition, the assets of the network should be available to authorized parties, and thus not be unduly susceptible to denial of use attacks.

Wireless transmissions are generally more prone to attacks that impact these security requirements. For instance, the wireless transmission may be susceptible to the attacks of eavesdropping, replay, and spoofing. These security requirements are complicated by the nature of ad hoc networks. Mobile nodes tend to have power constraints, either due to the use of portable power supplies or due to physical and regulatory constraints on the radiated power of the wireless transmission. Often mobile nodes are constrained in the processing speed and memory storage to reduce the amount of heat generated, power consumption, size, and cost. In addition, wireless communications is more easily intercepted and disrupted than hard-wired communication media.

Authentication of mobile nodes and the source of communication from mobile nodes is a crucial guarantee for many of these security concerns. Unauthenticated messages may be discounted, reducing the potential harm that may result from relying upon an untrustworthy communication. In conventional wireless networks, base stations are fixed and share secret keys with mobile nodes. The base station acts as a certification authority (CA) for authenticating mobile nodes that are in its purview. The CA needs to be a completely trusted entity that issues a digital certificate to any mobile node that needs to be authenticated. A sending node uses the digital certificate, or digital signature, by sending it along with a message encrypted with a private key. Upon receipt, the receiving node decrypts the message with a public key.

Strong authentication in conventional wireless networks thus requires base stations, significant processing overhead by mobile nodes to use a public-private key encryption for each message, and thus significant power consumption. These constraints are undesirable or unavailable in ad hoc networks.

Consequently, a significant need exists for a method for authenticating mobile nodes and communication within an wireless network, especially an ad hoc network.

SUMMARY OF THE INVENTION

The present invention addresses these and other problems by providing a method, apparatus, and program product that authenticate a source of a packet communication between nodes of a hierarchical ad hoc network without excessive computational and power consuming overhead of full public key encryption.

In one aspect consistent with the invention, packet communication in an ad hoc network between a sending node of a first cluster and a receiving node of a second cluster is authenticated by certification of the sending and receiving nodes by their respective cluster heads, as evidenced by their providing a session encryption key for the nodes. During the session, packets transmitted are authenticated by encrypting a sequentially selected one of a plurality of unique authentication tags with the session encryption key. Each unique authentication tag is digitally signed by the cluster head of the first cluster and sequentially appended to each packet.

There are three different scenarios where authentication needs to be performed. First, when a node wishes to join an ad hoc network for the first time, a cluster head, that received a certified public key message from the node, challenges the joining node with a nonce. The joining node responds to the challenge by digitally signing the nonce with its certified private key. The cluster head then responds by giving the joining node a cluster secret key and a cluster head public key. Second, when a node moves from one cluster to another cluster, a cluster head that gains the node as a member performs the procedure for a new node to the network. The cluster head that is losing the node as a member deletes its stored references to the node as member after failing to hear from the node for a period of time.

Third, when a node of one cluster wishes to communicate with a node of another cluster, a methodology is performed whereby the respective cluster heads for the sending and receiving nodes ensure authentication and message integrity, yet these overhead burden is minimized. For complete confidentiality, the entire packet communicated between nodes has to be encrypted with a session secret key. The session secret key is shared solely by the sending and receiving nodes involved in the communication and therefore serves as authentication. However, in some instances where authentication is emphasized and confidentiality is not critical, it is unnecessary to encrypt the entire packet. In order to prevent message replay problems, strong authentication is included for each packet, ordinarily a series of challenge and response between nodes is necessary, but this imposes excessive delays and packet processing overhead that is not feasible or desirable. Instead, an encrypted authentication tag is appended to each packet, which is sufficient to achieve authentication.

If the sending node wishes to communicate with a receiving node, a session secret key is established that is valid only for a TCP session. If the session is very long, which is uncommon in ad hoc networks, a new session secret key may be exchanged. The session secret key is exchanged after mutual authentication for which their corresponding heads act as certification authority. The cluster head private keys are used to encrypt the session secret key. Each cluster head then decrypts and transmits the session secret key to its corresponding member node who are involved in the session.

The sending node also requests authentication tags from its cluster head. In response thereto, the cluster head generates a set of "k" random prime numbers, $(R_1, R_2, \ldots Rk)$, that are fairly large. The "k" numbers are encrypted first with the cluster head's private key and then with the cluster secret key, along with a time stamp that is also encrypted so that the authentication tags may be used for a limited amount of time. The time period for which the tags are valid is selected for the degree of security desired or necessary. Each cluster head has a table containing these encrypted, time-stamped authentication tags: $E\_ck\ (E\_pv(R_1, t\_v))$ to $E\_ck\ (E\_pv(R_k, T\_v))$, where $E\_ck$ is encryption using the cluster secret key, $E\_pv$ is encryption using the cluster head's private key and $t\_v$ is the corresponding time stamp.

The cluster head then transmits the "k" encrypted values $E\_ck\ (E\_pv(R_1, t\_v))$ to $E\_ck\ (E\_pv(R_k, T\_v))$ to at least the sending node that requested the tags. All other member nodes of the cluster could also receive, buffer and use these tags for authentication since the tags have been encrypted with the cluster head's private key.

The sending node encrypts the authentication tags with the session secret key and sequentially appends each to the packets. The session secret key protects the tags from malicious listeners. The appended tags are also advantageously padded with garbage bits to make isolation of the tag more difficult. In particular, when a window of "w" packets is to be sent, the sending node selects a permutation of size "w" from the "k" authentication tags. To each packet, one of the "w" tags is appended.

The sender applies a check function to the tags, considering "m" at a time, with the number "m" selected for the application. For example, since the tags are prime numbers, the check function could be as simple as the product of the decrypted tags: $check(R_0, R_1, \ldots R_{m-1})$, $check(R_m, R_{m+1}, \ldots R_{2m-1})$, $check(R_{2m}, R_{2m+1}, \ldots R_{3m-1}) \ldots$ This check function result would be unique. The results for each "m" authentication tags is encrypted along with the packets, along with a sequence number for the highest sequence number for the group of "m" tags. The session key is used for this encryption.

When the receiving node receives the packets with tags appended, the receiving node is able to verify the origin and authenticity of the tags. The receiving node has the check function performed on the decrypted tags that yields a computed value. The receiving node also decrypts the check function result sent by the sending node, comparing with the computed value to determine validity of the tags.

Since the check function result is computed for every "m" packets, the receiving node may narrow down the search for unauthenticated packets to the corresponding range of "m" tags. To further assist in ensuring data integrity, the checksum field of the TCP header is also encrypted with the session secret key so that any tampering of the data may be detected.

By virtue of the foregoing, a flexible ad hoc network of elected cluster heads and member nodes under their purview are able to authenticate nodes and communication, thwarting listeners who attempt to spoof other nodes by replaying or altering packet communication. Moreover, the advantages of authentication are not at the expense of requiring expensive base stations with access to sufficient power and computational capability.

Various advantages, objectives, and features of the invention will become more readily apparent to those of ordinary skill in the art upon review of the following detailed description of the preferred embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE PREFERRED EMBODIMENTS

Strong authentication of packets sent between nodes of different clusters in a two-tier ad hoc network is provided by the cluster heads. The cluster head authenticates a node that enters the cluster. Thereafter, when the node requests a session with a node in another cluster, the cluster head negotiates a session secret key (SSK) with the corresponding cluster head of the receiving node. Further, the cluster head provides authentication tags for the sending node to use with each packet. The sending node calculates a check result from a number of the authentication tags, which are then encrypted with the SSK, so that the receiving node can authenticate the number of packets.

Figure 1:
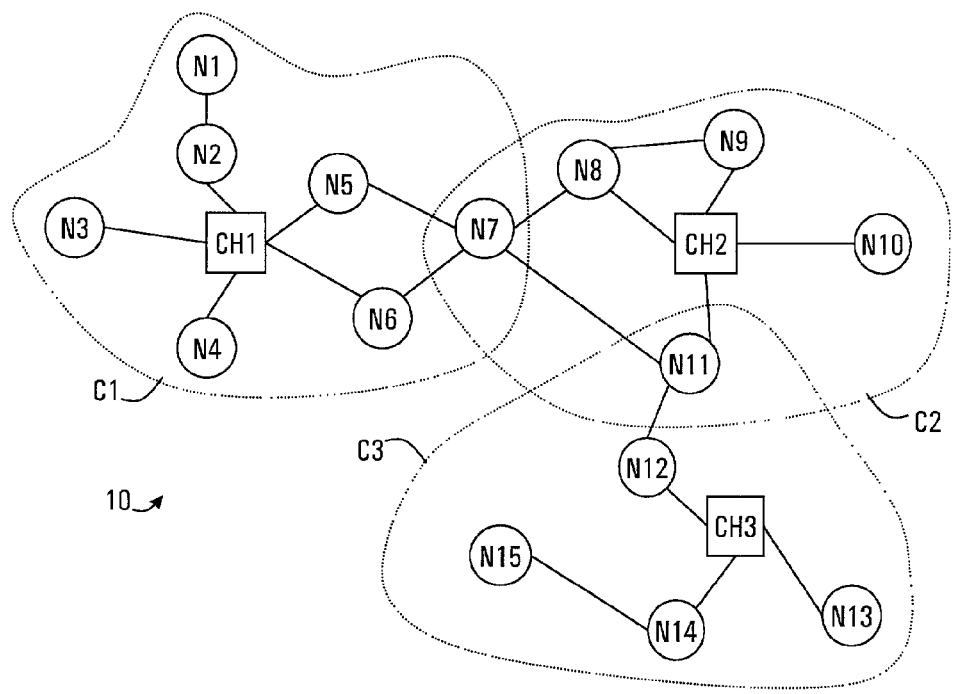
FIG. 1 is a diagram of a two-tier ad hoc network of three clusters.

Turning to the Drawings, wherein like numbers denote like parts throughout the several views in FIG. 1, an ad hoc network 10 is depicted with a hierarchical architecture for advantageously minimizing the flooding of route discovery packets as nodes attempt to find a path to other nodes. The routing protocol that is used is Cluster Based Routing Protocol (CBRP), which is suitable for a large network of a number of nodes, each having an identifier (ID). The entire network 10 is divided into a number of overlapping or disjoint 2-hop diameter clusters as depicted in FIG. 1.

In particular, the network 10 is illustrated as consisting of three clusters C1–C3, each managed by a respective cluster head CH1–CH3. Unlike conventional wireless networks, each cluster head CH1–CH3 is dynamically elected as the situation changes from member nodes N1–N15, with the election made in a manner known to those skilled in the art, such as by signal strength and/or having a lower node ID.

Cluster C1 is depicted as having cluster head CH1 in one-hop communication with member nodes N2–N6 and in two-hop communication with member node N1 via node N2 and member node N7 via both nodes N5 and N6. Cluster C2 is depicted as having cluster head CH2 as being in one-hop communication to member nodes N8–N11 (with nodes N8 and N9 also in direct communication) and in two-hope communication with member nodes N7 via both nodes N8 and N11. Cluster C3 is depicted as having cluster head CH3 in one-hop communication with member nodes N12–N14 and in two-hop communication with member node N11 via node 12 and with member node N15 via node N14. Node N7 is a gateway node to both clusters C1 and C2 and node N11 is a gateway node to both clusters C2 and C3.

Although a two-tier cluster ad hoc network 10 is illustrated, it will be apparent to those skilled in the art having the benefit of the present invention that aspects of the present invention apply to one-tier ad hoc networks wherein each node also acts as a certification authority. In addition, strong authentication has advantages in networks that are entirely or partially hard-wired (e.g., electrical or optical communication links).

Figure 2:
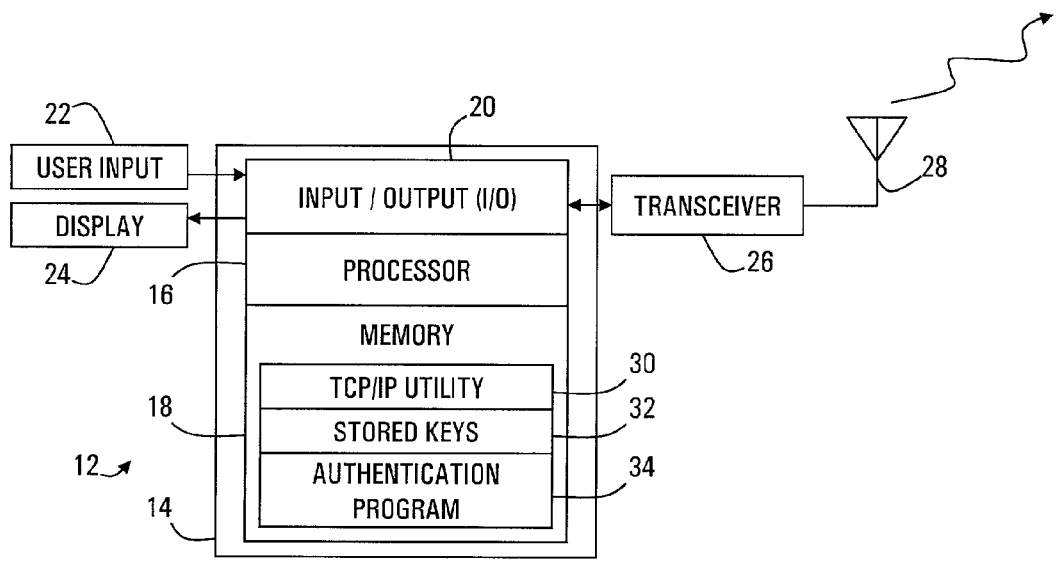
FIG. 2 is a block diagram of a mobile node of the ad hoc network of FIG. 1.

With reference to FIG. 2, a mobile computer 12 is illustrated for one of the cluster heads C1–C3 or member nodes N1–N15. The computer 12 is comprised of a controller 14 that processes digital communication and interacts with a user. In particular, the controller 14 comprises a processor 16 that accesses a memory 18 and an input/output (I/O) interface 20. A user interacts with the controller 14 through a user input 22, such as microphone and keypad, and a display 24. The controller 14 reaches other nodes by transmitting and receiving data packets via the I/O interface 20 to a transceiver 26 for transmission by an antenna 28. The data communication is generated or interpreted by the processor 16 by use of a communication program stored in memory 18, such as a Transmission Control Protocol/Internet Protocol (TCP/IP) utility 30, that utilizes stored encryption keys 32 and an authentication program 34 consistent with aspects of the present invention.

In the illustrative embodiment, data communication is made of data packets consistent with TCP/IP, which is the native format popularized by the Internet. However, those of ordinary skill in the art with the benefit of the present invention will recognize that aspects of the invention are applicable to various data communication protocols wherein packets of data are transmitted.

The computer 12 may include a laptop top computer with a wireless communication capability (e.g., infrared link), a digital mobile telephone incorporating text communication capability, a "smart sensor", or other devices with sufficient computational power to execute the encryption and key generation algorithms described herein.

In general, the routines executed to implement the embodiments of the invention, whether implemented as part of an operating system or a specific application, component, program, object, module, or sequence of instructions, will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally, regardless of the particular type of signal bearing media used to actually carry out the distribution. Examples of signal bearing media include, but are not limited to, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIG. 2 are not intended to limit the present invention. Indeed, those skilled in the art will recognize that other alternative hardware and/or software environments may be used without departing from the scope of the invention.

Figure 3:
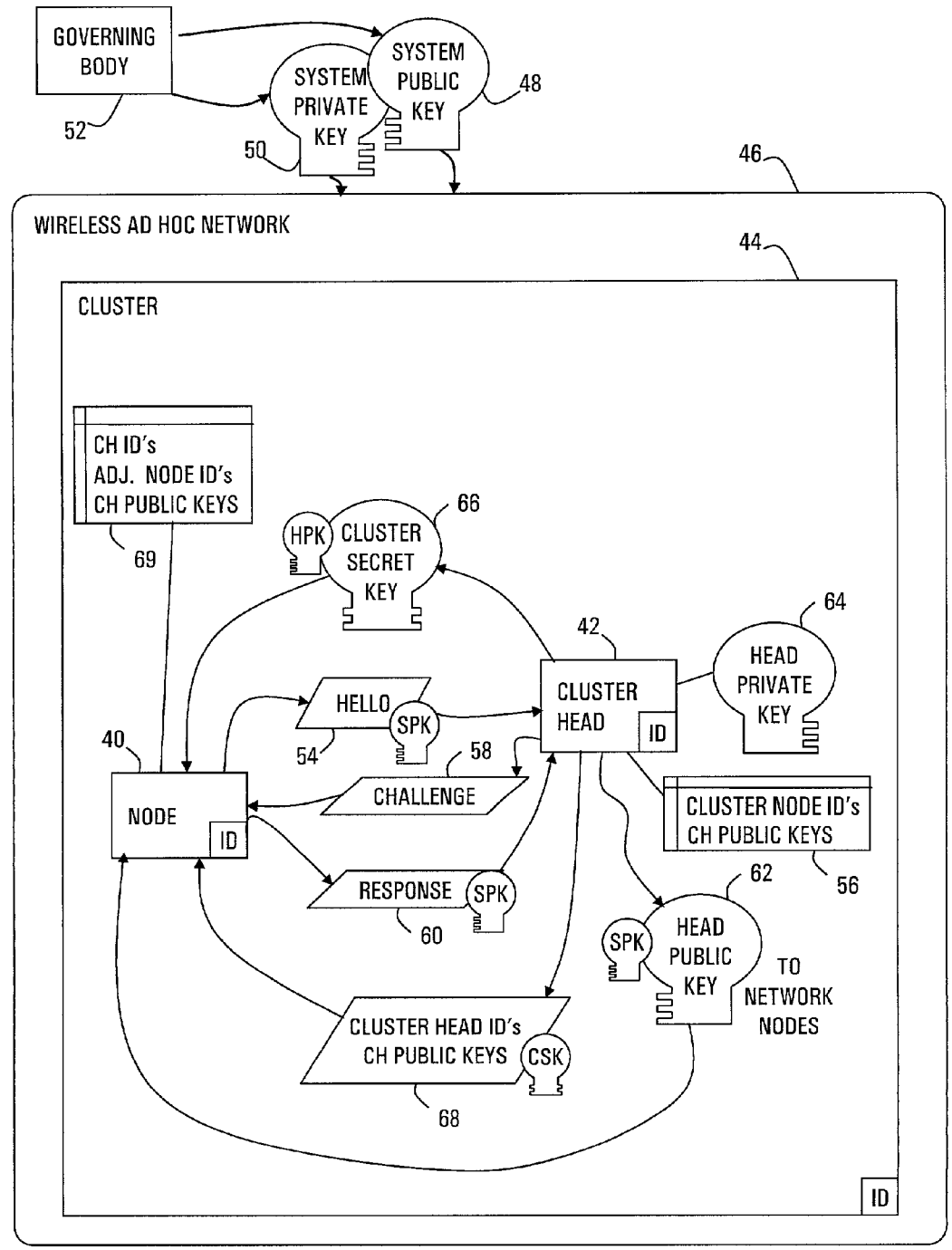
FIG. 3 is a diagram illustrating communication between a cluster head and a node joining the cluster of the ad hoc network of FIG. 1, consistent with aspects of the present invention.

With reference to FIG. 3, a diagram illustrates interaction between a node 40 and a cluster head 42 of a cluster 44 that is part of the wireless ad hoc network 46. The basis for trustworthiness of node 40 and cluster head 42 is that each is given a system private key 48 and a system public key 50 by a governing body 52, such as Rivest-Shamir-Adleman (RSA) Data Security of Redwood City, Calif.

Public-key cryptography, such as RSA, uses two very large keys. The private key is retained by the sender and is used to encrypt the message. The public key is given to a trusted receiver, and is used to decrypt the message. Public key encryption tends to be more computationally intensive than secret key encryption, wherein the same key is used to both encrypt and decrypt the message, although public key encryption has the advantage of not sending the private key over the network 46. Consequently, untrustworthy nodes are not able to pretend to be the node 40 by encrypting a message with the same private key 50.

Periodically, the node 40 transmits a hello message 54. The hello message is encrypted with the system private key 50 and can be decrypted with the system public key ("SPK") 48. The hello message 54 also includes information regarding nodes that are within one hop of the node 40.

In response to the hello message 54, the cluster head 42 references a locally-stored table 56 of the node IDs for members of the cluster 44 to determine whether the node 40 is a member. If the ID for the node 40 is not in the table 56, the cluster head 42 sends a challenge message 58, or nounce, to the node 40, whereupon the node 40 replies with a response message 60, such as digitally signing the nounce with the system private key 50.

In response, the cluster head 42 sends a head public key 62 that has been encrypted with the system private key 50, and retains a head private key 64. The cluster head 42 also sends a cluster secret key 66 encrypted with the head private key 64. In addition, the cluster head 42 sends a table 68 of the other cluster IDs and cluster head public keys. Consequently, the storage requirement for each node is reduced to storing the cluster secret key 66 and the head public keys 62 for other clusters, which advantageously reduces required memory size, especially for large networks 10.

In the event that a new node is two hops away from the cluster head 42, an intermediate node (not shown) would initiate authentication by reference to its cluster ID table 56 and a challenge and response with the system public and private keys 48, 50. When the intermediate node transmits its periodic hello message 54, the inclusion of the adjacent node IDs in the hello message 54 will prompt the cluster head 42 to complete the inclusion of the node 40 to the cluster 44.

Figure 4:
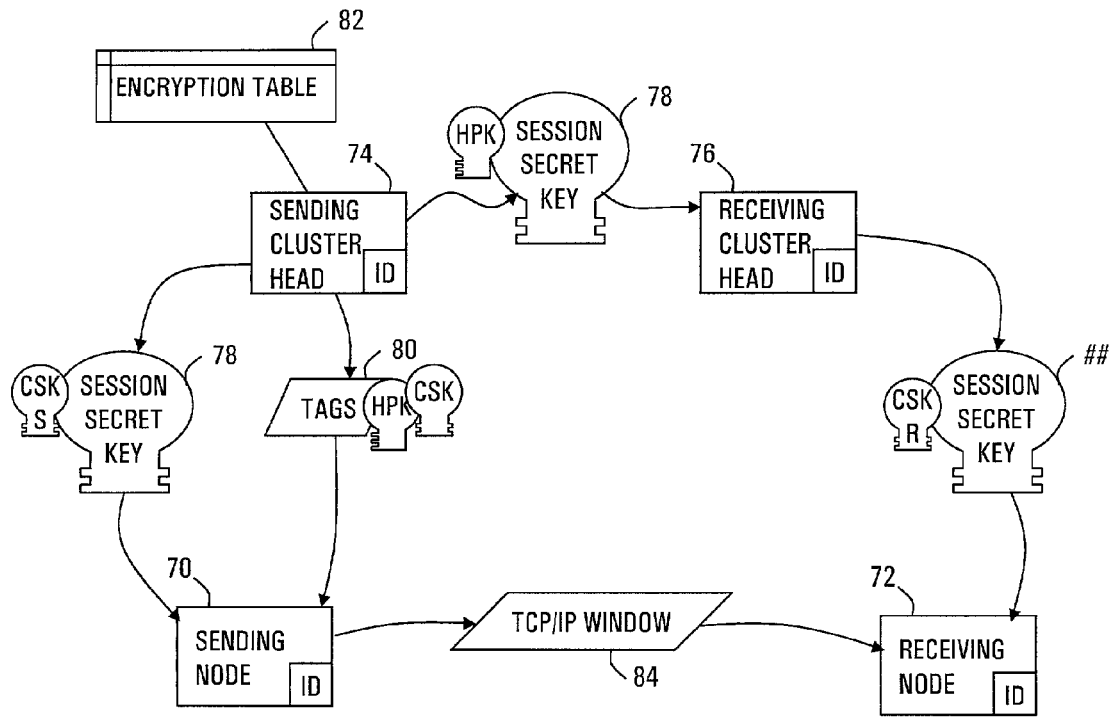
FIG. 4 is a diagram illustrating communication between a sending node of one cluster and a receiving cluster of another cluster of the ad hoc network of FIG. 1, consistent with aspects of the invention.

FIG. 4 depicts communication between a sending node 70 and a receiving node 72 that is certified by their respective cluster heads 74, 76. The receiving node 72 is capable of authenticating the source of the communication and its integrity based on authentication tags included with each packet.

In particular, the sending node 70 initiates communication by contacting the sending cluster head 74, which in turn sends a session secret key 78, encrypted with the head private key of the sending cluster head 74, to the receiving cluster head 76. The session secret key is disseminated to the sending and receiving nodes 70, 72. Specifically, the sending node 74 encrypts the session secret key 78 with the sending cluster secret key ("CSK S") for the sending node 70. The receiving node 76 encrypts the session secret key 78 with the receiving cluster secret key ("CSK R").

The sending cluster head 74 calculates a plurality of authentication tags, such as a number "k" of large prime numbers. These tags 80 are digitally signed with the head private key and encrypted with the sending cluster secret key and sent to the sending node 70. The sending cluster head 74 retains a table 82 of the encrypted authentication tags for monitoring their later use. In addition, each authentication tag is advantageously time stamped so that their use is limited in time. The duration of the time stamp may be set to trade off security with overhead burden in recalculating and disseminating.

It will be appreciated that the sending cluster head 74 advantageously utilizes periods of less communication overhead to calculate and encrypt a permutation of authentication tags 80 and store them in table 82 until requested. In addition, to further reduce computational overhead and power consumption, all of the nodes in the cluster may advantageously cache the authentication tags 80 for use during the period allowed by the time stamp.

Figure 5:
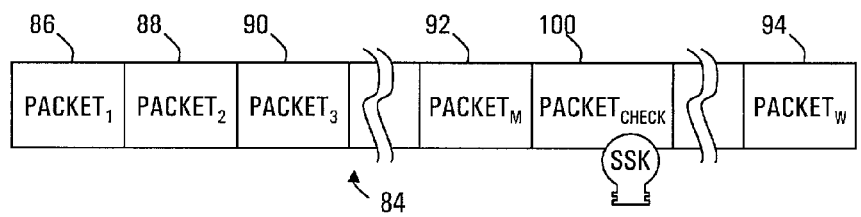
FIG. 5 is a data structure of a window of packets sent by the sending node of FIG. 4.
Figure 6:
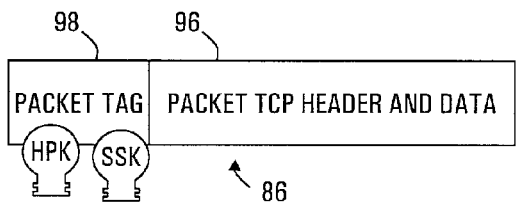
FIG. 6 is a data structure of a packet sent by the sending node of FIG. 4.

The sending node 70 is thereby ready to send a TCP/IP window 84 of packets to the receiving node 72 through an appropriate routing through the network 10. With reference to FIG. 5, the TCP/IP window 84 is depicted as comprised of a number "W" of packets 86–94. A representative packet 86 is depicted in FIG. 6 as including a packet TCP header and data 96 with a packet tag 98 used for authentication. Returning to FIG. 5, the tag 98 is advantageously encrypted with the session secret key and the head private key for the sending cluster head 74. The tag 98 may further include "garbage bits" to reduce the likelihood of misuse.

Over a portion "M" of the "W" packets 86–94 shown in FIG. 5, a check sum result is calculated from the authentication tags, such as by multiplying the large prime numbers of each tag in the group of M tags. As prime numbers, the check result will be unique. The check result and other indicators of integrity such as the TCP/IP field for check sum, are encrypted with the session secret key and stored in a check packet 100. Also, the highest sequence number of the M tags is encrypted. The check packet 100 may include a number of check sum results for each group of "M" packets within the window 84.

It will be appreciated by those skilled in the art that the amount of required public key encryption for authentication has been reduced, replaced in part with secret key encryption. In addition, when confidentiality is not a concern, the message data may be transmitted unencrypted. Yet, communication integrity is maintained by the encrypted authentication tags and checksum data. With less computationally intensive encryption, each node has less overhead to perform and consumes less power.

Figure 7:
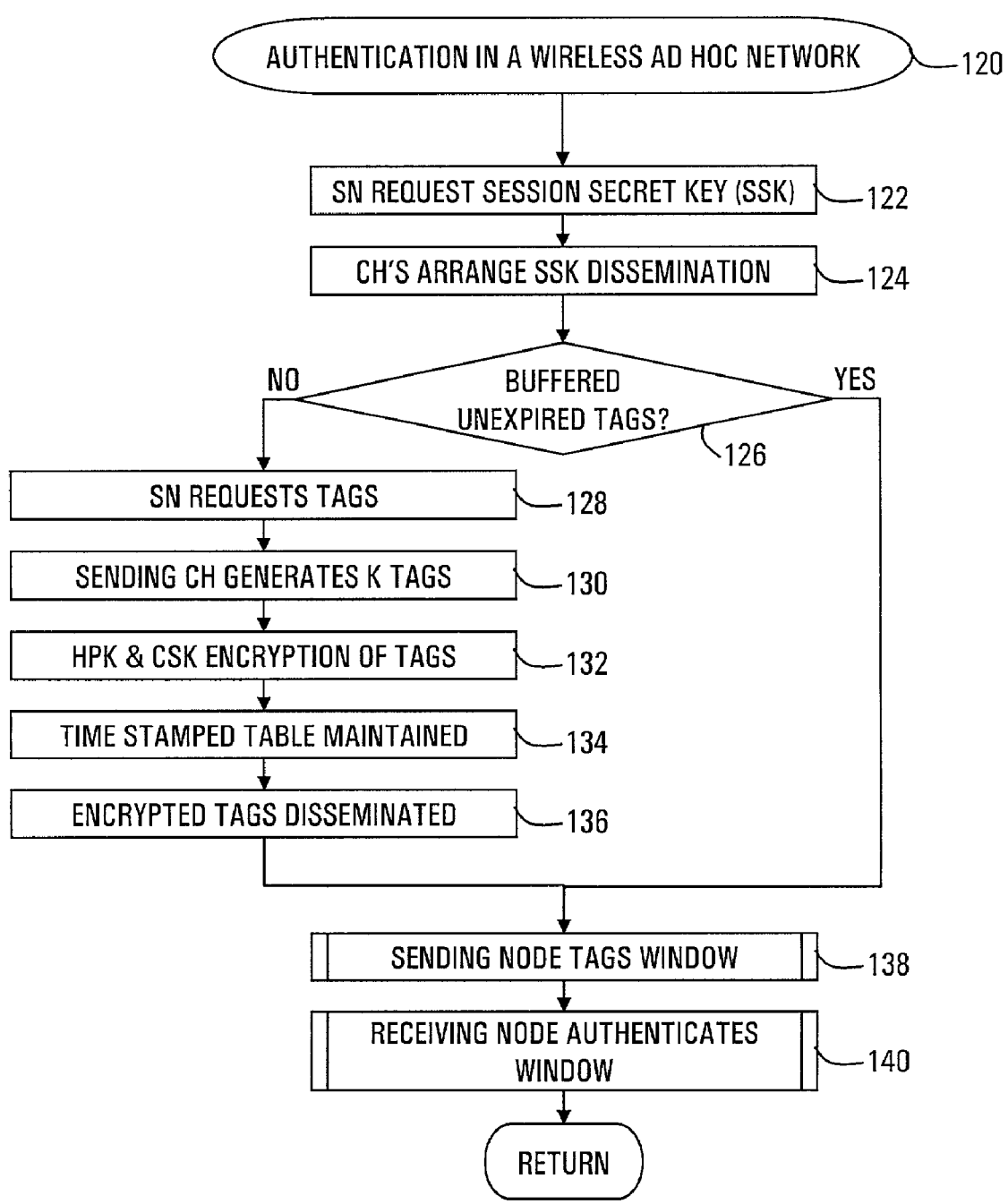
FIG. 7 is a flowchart for performing a sequence of operations performed by the ad hoc network of FIG. 1 to achieve improved authentication.

FIG. 7 depicts a sequence of operations performed by nodes N1–N15 and cluster heads CH1–CH3 within the ad hoc network 10. It will be appreciated that each may advantageously include an authentication program configured to perform some or all of the portions of the operations, depending on the situation. For example, a sending node may subsequently receive packet communication during the same session or subsequent sessions. Also, the same node may be elected cluster head and be responsible for certifying member nodes. Furthermore, other member nodes have a role in relaying packet communication and can enhance authentication by assisting in the detection of untrustworthy nodes and in taking corrective action.

In particular, a routine 120 for authentication in a wireless ad hoc network begins with a sending node requesting a session secret key for a new TCP session, or for a continued lengthy TCP session, with another node (block 122). In response thereto, the cluster head for the sending node arranges a session secret key with the cluster head with purview over the receiving node and the session secret key is disseminated to the sending and receiving nodes (block 124).

Then a determination is made as to whether the sending unit has stored or buffered unexpired authentication tags (block 126). If not, then the sending node requests tags from the cluster head (block 128). The sending cluster head generates a number "K" of authentication tags, or accesses previously calculated but not disseminated tags (block 130). The sending cluster head signs each tag with the head private key and encrypts with the cluster secret key (block 132). The cluster head retains a table of the tags and their time stamps (block 134). Then, the encrypted tags are disseminated to the cluster (block 136).

After the tags are disseminated in block 136 or located in local memory in block 126, the sending node uses the tags by tagging TCP windows and routing the tagged windows through the network (block 138). Upon receipt of the tagged window, the receiving node authenticates the window (block 140).

Figure 8:
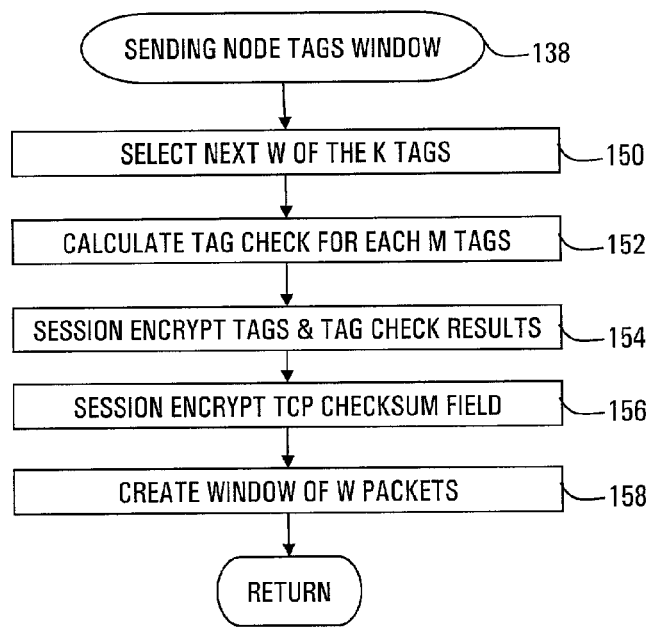
FIG. 8 is a flowchart referenced in FIG. 7 for a sequence of operations by the sending node to add authentication tags to a window of packets.

With reference to FIG. 8, the routine 138 for sending node tagging windows referenced in FIG. 7 is depicted in greater detail. First, a subset of size "W" of the "K" authentication tags is sequentially selected (block 150). Then, a check result is calculated from the M tags, such as by multiplying the M tags, as well as implementing the highest sequence value of the tags (block 152). The W authentication tags retain the digital signature of the cluster head by having been encrypted with the head private key and readable with the head public key. Each of the W tags is encrypted with the session secret key (block 154). Also, other indicators of message integrity, such as the TCP header field for checksum, are also encrypted with the session secret key (block 156). Then, the window of W packets is created, each packet tagged with one of the encrypted authentication tags (block 158). Control returns to repeat routine 138 depending on the number of packets to be sent.

Figure 9:
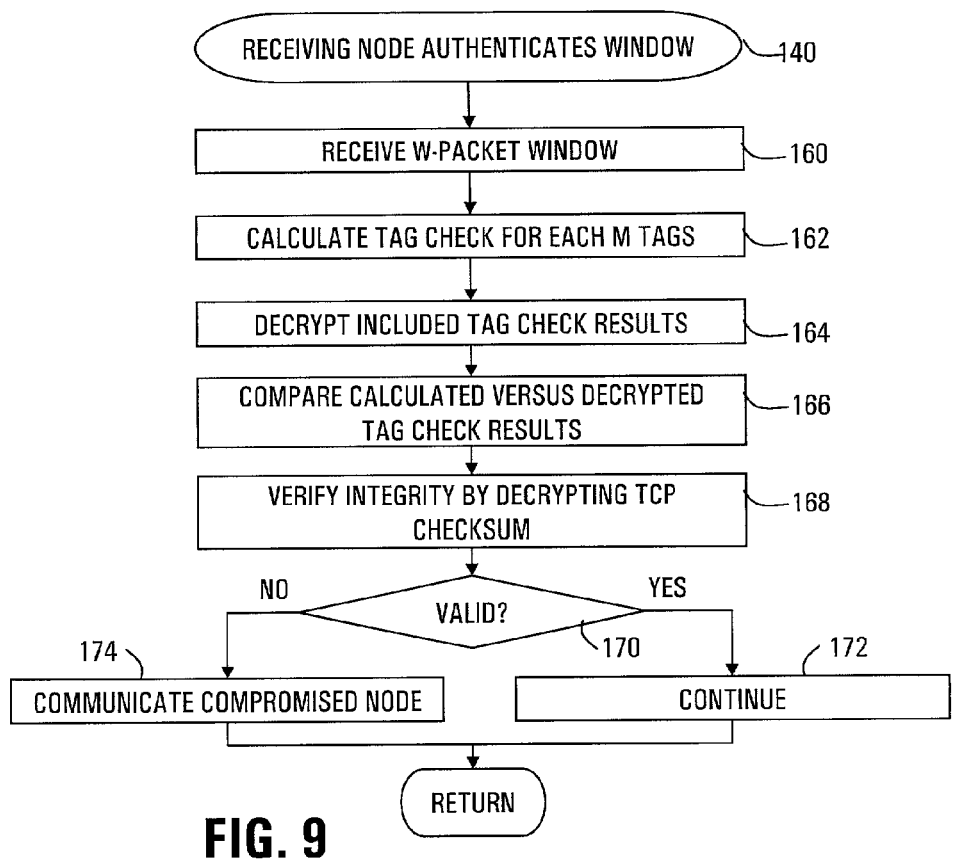
FIG. 9 is a flowchart referenced in FIG. 7 for a sequence of operations by the receiving node to authenticate a window of packets received from the sending node.

With reference to FIG. 9, the routine 140 is depicted for the receiving node to authenticate the window of W packets referenced in FIG. 7. When the W-packet sized window is received (block 160), the check result for the subset of M tags is calculated (block 162). Also, the check result for the subset of M tags is decrypted from the window (block 164) and compared with the calculated check result (block 166). Also, the other indicators of message integrity are checked, such as by decrypting the TCP header field for checksum and the sequence number for the tags (block 168). Then a determination is made as to whether the results of the authentication and integrity check are that the message is valid (block 170). Part of this determination is whether the sequence numbers have not been repeated, which would be indicative of a listener replaying tags. If valid in block 170, then additional reception and interpretation of windows continues (block 172). If not valid in block 170, the detection of a compromised node is communicated to the network (block 174).

In use, nodes within an ad hoc network are certified by their elected cluster heads with TCP communication that is tagged with a time-limited digital signature of the certifying cluster head and encrypted with a session secret key. By virtue of the foregoing, data authentication and integrity is enhanced by tags that authenticate based on the cluster head's private key. The check performed by the receiving node verifies that the tags are valid and not being replayed by a non-network listener. Moreover, since the sequence numbers of the tags is also decrypted, a listener cannot replay the tags since the sequence is not allowed to repeat. Data integrity is further enhanced by the encrypted checksum.

While the present invention has been illustrated by a description of various preferred embodiments and, while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations, depending on the needs and preferences of the user. This has been a description of the present invention, along with the preferred methods of practicing the present invention as currently known. However, the invention itself should only be defined by the appended claims, wherein

We claim:

1. A method for authenticating a packet comprising header and packet data in an ad hoc network between a sending node of a first cluster having a first cluster head and a receiving node of a second cluster having a second cluster head, the method comprising:
   establishing a session encryption key using said first and second cluster heads;
   communicating said session encryption key to the sending and receiving nodes;
   encrypting the packet with said session encryption key;
   digitally signing an authentication tag of a plurality of authentication tags, wherein the authentication tag comprises a prime number;
   encrypting the digitally signed authentication tag with the session encryption key;
   appending the encrypted and digitally signed authentication tag to the encrypted packet; and
   determining a check result using the appended authentication tag for use in authenticating the packet.

2. The method of claim 1, wherein appending the encrypted and digitally signed authentication tag further comprises:
   generating a table of the plurality of authentication tags for monitoring use of the plurality of authentication tags.

3. The method of claim 1, further comprising:
   encrypting a tag sequence number; and
   appending the encrypted tag sequence number to a plurality of packet communications.

4. The method of claim 1, further comprising:
   in response to a request for the authentication tag by the sending node to the cluster head of the first cluster, generating the authentication tag;
   associating a time stamp with the authentication tag;
   encrypting the authentication tag with the associated time stamp; and
   sending the encrypted authentication tag to the sending unit.

5. The method of claim 4, wherein generating the authentication tag further comprises generating at least the prime number.

6. The method of claim 1, further comprising:
   encrypting the check result with the session encryption key; and
   appending the encrypted check result to the authentication tagged packet.

7. The method of claim 6, wherein appending the encrypted check result further compnses encrypting a checksum field with the session encryption key.

8. The method of claim 6, further comprising:
   in response to receiving the authentication tagged packet, decrypting the authentication tag and appended check result with the session encryption key; and
   determining a valid authentication by comparing the calculated check result with the appended check result.

9. The method of claim 1, wherein determining the check result comprises performing an arithmetic operation on the authentication tag.

10. The method of claim 9, wherein the authentication tag is generated, and wherein generating the authentication tag further comprises generating at least the prime number, and wherein performing the arithmetic operation comprises multiplying the authentication tag.

11. The method of claim 1, further comprising:
    in response to a message from the sending node to the cluster head of the first cluster, determining whether the sending node is a trusted node of the ad hoc network by challenging the sending node to respond with a system private encryption key.

12. An apparatus, comprising:
a memory; and
a program, resident in the memory, the program configured to receive a session encryption key established by a first cluster having a first cluster head and a second cluster having a second cluster head, and to encrypt a packet for communication to a receiving node of the second cluster using the session encryption key, wherein the program is further configured to digitally sign an authentication tag of a plurality of authentication tags, wherein the authentication tag comprises a prime number, and to encrypt the digitally signed authentication tag with the session encryption key; wherein the program is further configured to append the encrypted and digitally signed authentication tag to the encrypted packet, and to determine a check result using the appended authentication tag for using in authenticating the packet.

13. The apparatus of claim 12, wherein the program generates a table of the plurality of authentication tags for monitoring use of the plurality of authentication tags.

14. The apparatus of claim 12, wherein the program is further configured to perform as the first cluster head of the first cluster, and in response to a request for the authentication tag by another sending node of the first cluster, to generate the authentication tag, and to associate a time stamp with the authentication tag, to encrypt each authentication tag with the associated time stamp, and to send the encrypted authentication tag to the sending node.

15. The apparatus of claim 14, wherein the program is configured to generate the authentication tag by generating at least the prime number.

16. The apparatus of claim 12, wherein the program is further configured when acting as the sending node to encrypt the check result with the session encryption key, and to append the encrypted check result to the authentication tagged packet.

17. The apparatus of claim 16, wherein the program is further configured when acting as the receiving node, in response to receiving the authentication tagged packet, to decrypt the authentication tag and the appended check result with the session encryption key, and to calculate a new check result from the authentication tag, and to determine a valid authentication by comparing the calculated check result with the appended check result.

18. The apparatus of claim 12, wherein the program is configured when acting as the sending node to calculate the check result by performing an arithmetic operation on the plurality of authentication tags.

19. The apparatus of claim 18, wherein the program is configured to perform the arithmetic operation by multiplying the authentication tag.

20. The apparatus of claim 12, wherein the program is further configured to encrypt a checksum field with the session encryption key.

21. The apparatus of claim 12, wherein the program is further configured when acting as the first cluster head, in response to a message from the sending node, to determine whether the sending node is a trusted node of an ad hoc system by challenging the sending node to respond with a system public encryption key.

* * * * *